United States Patent
Basawapatna et al.

(10) Patent No.: US 9,490,851 B2
(45) Date of Patent: Nov. 8, 2016

(54) HIGH SPEED ADAPTIVE SWEEP CAPABLE DIGITAL TRANSCEIVER

(71) Applicants: Ganesh Ramaswamy Basawapatna, Greenwood Village, CO (US); Varalakshmi Basawapatna, Greenwood Village, CO (US); Anand Ganesh Basawapatna, Greenwood Village, CO (US); Ashok Ram Basawapatna, Greenwood Village, CO (US)

(72) Inventors: Ganesh Ramaswamy Basawapatna, Greenwood Village, CO (US); Varalakshmi Basawapatna, Greenwood Village, CO (US); Anand Ganesh Basawapatna, Greenwood Village, CO (US); Ashok Ram Basawapatna, Greenwood Village, CO (US)

( * ) Notice: Subject to any disclaimer, the term of this patent is extended or adjusted under 35 U.S.C. 154(b) by 220 days.

(21) Appl. No.: 14/271,172

(22) Filed: Jun. 17, 2014

(65) Prior Publication Data
US 2015/0362538 A1 Dec. 17, 2015

(51) Int. Cl.
*H04B 1/38* (2015.01)
*H04B 1/00* (2006.01)

(52) U.S. Cl.
CPC ................ *H04B 1/0003* (2013.01)

(58) Field of Classification Search
CPC ...... G01S 13/89; G01S 13/56; G01S 13/887; G01S 7/36; H04B 1/44; H04B 1/0003; H04B 17/23; H04B 1/00; H04B 1/126; H04B 1/38; H04B 7/18515; G01R 23/165
USPC ......... 375/316, 219; 342/133, 20; 455/73, 1; 324/76.19, 76.26
See application file for complete search history.

(56) References Cited

U.S. PATENT DOCUMENTS 9,229,102 B1* 1/2016 Wright .................. G01S 13/888

* cited by examiner

*Primary Examiner* — Rahel Guarino

(57) ABSTRACT

This invention pertains to a method by which the frequency and the modulation characteristics of a wire or wirelessly transmitted signal can be identified in a matter of milliseconds with significantly higher speed and accuracy than with existing or prior art receivers and spectrum analyzers, without erroneous image signals. Such signals can be then demodulated and decisions made based upon the demodulated data. The system then can be reconfigured to act as a transmit-receive module, with the transmit frequency enabled to address many different applications. This has applications in, terrestrial and satellite communications, and defense.

13 Claims, 5 Drawing Sheets

HIGH SPEED ADAPTIVE SWEEP CAPABLE DIGITAL TRANSCEIVER

CROSS RELATION TO RELATED APPLICATIONS application Ser. No. 13/775,522, Confirmation No. 3032, Apparatus for Very High Speed Adaptive Spectrum Analysis First Line of above Patent Application: This invention pertains to a method to create the ability to analyze RF and microwave signals via a new form of spectrum analyzer.

FIELD OF THE INVENTION

The field of this invention is high speed signal identification, reception, analysis and transmission for defensive or communication purposes by a system that uses a minimal number of components to achieve multiple transceiver functions with high accuracy and high speed.

DEFINITION OF TERMS

Local Oscillator (LO): When a signal frequency is desired to be translated to another frequency a Local Oscillator is used in conjunction with a mixer to create the Intermediate Frequency (IF).

Mixer: When two frequencies, F1 and F2 are input to two ports of a mixer, it typically generates $\pm m.F1 \pm n.F2$, frequencies, where m and n are integers.

Intermediate Frequency (IF): All the resultants of the mixing process in the above paragraph are called IFs. In particular, frequencies generated with m=n=1 are most often used in what is called Fundamental Mixing.

IF Bandwidth: The bandwidth of the filter, which is typically a band-pass filter that follows the mixer and selects only the desired IF. This reduces noise in the receiver.

Video Detector: A device that creates a DC of Baseband signal or voltage proportional to the amplitude of the RF or IF signal applied to it.

Up-Conversion: The process of taking a lower frequency based signal, sometimes called "baseband" and converting it into the sidebands of a much higher frequency sinusoidal signal for transmission in a wireless fashion.

Log Amp: Logarithmic Amplifier. Usually follows a detector and creates an output which is logarithmically proportional to the output so that the output can be displayed in decibels (dB).

Sweep: Also called frequency sweep. It is the tuning of an oscillator or in some cases a filter from some start frequency to some stop frequency. It is possible to sweep in an Analog fashion where the frequency changes continuously with time, or in digital fashion, where the frequency steps discretely with time.

Reference Oscillator: An oscillator usually based upon an ideal resonator such as a Crystal Resonator with the property that its output waveform is very stable and has very low frequency drift and very low phase noise sidebands.

Resolution Bandwidth: This is the effective bandwidth within which the signal power is measured. It is used to measure the average power of a signal within a particular bandwidth. The narrower the resolution bandwidth, the more accurately are the sidebands of a carrier measured. However, narrower resolution bandwidths traditionally also mean longer measurement times, often with multiple sweeps.

Transceiver: An apparatus or unit that operates as a Receiver and Transmitter.

Headquarters (also referred to as "HO"): In the context of this application, this is the office or location with which a Transceiver communicates, and where decisions as to the configuration of the Transceiver are made.

BACKGROUND OF THE INVENTION

In a previous patent application, referred to in the CROSS RELATION TO RELATED APPLICATIONS section, a new method of accurate signal reception was defined, which described a method to do Spectrum Analysis of RF and Microwave signals without the use of pre-selection, thus allowing a number of function heretofore not possible in traditional spectrum analyzers. These included very fast digital sweeping with speeds in the order of microseconds per frequency, allowing very wide bandwidth spectrum scanning in microseconds versus the traditional hundreds of milliseconds to seconds of time duration of sweeps. Also, the invention was shown to make it possible to have Adaptive sweeps, that is, to have the ability to stop sweeps and to have sweep frequency reversal to more closely look at a signal at a lower frequency without having to resort to a next sweep to do this.

While this advance in the state of the art is indeed extremely powerful, there are many situations in which, with the ability to be able to perform high speed Adaptive Sweep, it is possible to solve problems that were heretofore unsolvable without heavy and bulky test systems. Many vital battlefield signal interception and defensive functions that in the past were slow, required high power consumption, and were very large and heavy, can be miniaturized, made to consume much lower power, and become more easily field operable. This is important for a field based communications test technician or engineer, or a soldier in the field with unknown enemy signals ever present.

In particular, soldiers in the field, especially those involved in covert or semi-covert operations, face increasingly sophisticated and complex enemy capabilities. The enemy today may use any of the RF and Microwave frequency range to transmit signals, as opposed to known narrow frequency ranges in the past, to detonate IEDs, to guide missiles, or to communicate with other enemy units in the area. Not only is the frequency band available quite wide, but the enemy units will be increasingly frequency agile, and capable of using complex modulation schemes. Also, with increased sophistication, the enemy, just like our units, will transmit in short bursts, and observe radio silence at other times. Thus it is necessary for our equipment to intercept their communication fast, identify the frequency and signal content, and deploy appropriate countermeasures, whether jamming, deceptive, or other. Present technologies make it impossible to do this in less than seconds, which is too long a time to identify and react.

Even if the soldier were able to, with some luck, locate an enemy signal in time, he or she has no method to determine how to react without additional heavy transmitter equipment. This equipment has to be power miserly, very broadband, and frequency agile so that the enemy does not intercept this Head Quarters (HQ) communication. The soldier may need to initiate some deceptive transmissions. All this can result in additional weight to carry and manage for the soldier.

In commercial fields, such as telecommunications, with the advent of ultra-wide-bandwidth technologies, the field technician will need the ability to look at or receive signals over a wide bandwidth, identify them for their modulation or information content, and perhaps do some transmission testing. While the time element is not as critical as in the case of the soldier on the operational field, the need for light weight and low power consumption are just as economically significant.

The present invention addresses novel methods and hardware and software based techniques to address and solve these challenges.

SUMMARY OF THE INVENTION

This invention recognizes that the capability of a signal analyzer to recognize a real signal and discard a spurious "image" signal is critical. This is what the High Speed reception and Adaptive Sweep capability of the referenced prior application accomplishes.

In the scenario where, once a signal of interest is identified and captured, all possible information regarding the signal, including its frequency and any data it contains needs to be immediately recorded and acted upon, the most fundamental factor is the confidence that the signal being looked at, at that particular instant, when the Adaptive Sweep Signal Analyzer is used, is a real signal and not a spurious "image" frequency.

This has significant implications. Once a signal frequency is identified with this confidence, only one half of the receive section is needed beyond that point to process the signal. This not only halves the power needed in the RF chain, but it also allows the receiver to switch to a "high sensitivity" mode, where the signal is received and processed, without any time wasted, by much more sensitive circuits.

At the same time, the second half of the receive chain can now be redeployed as a transmit chain. It waits for a command to send data to HQ and for the frequency and duration of transmission, receives the demodulated signal from the High Sensitivity Receiver, modulates it appropriately, up-converts, enables the transmitter, transmits, and immediately returns to radio silence so the enemy cannot easily catch the transmission and so that vital battery power is conserved.

Thus the system described in the present invention uses the High Speed Digital Adaptive Receiver concept and elements to reconfigure and create a High Speed Adaptive Digital Transceiver that is Adaptive, Conserves Energy and Battery Power, is Multi-function, ultra wideband, image free, and handheld.

This is described in the detailed description of the invention that follows. Our invention provides the capability for our soldiers to be much better protected in the field than they presently are, given a much more well-armed and sophisticated enemy.

BRIEF DESCRIPTION OF THE DRAWINGS

The exemplary embodiments are best described by referring to the drawings attached. It should be emphasized that these drawings are for the purpose of explanation only. Many of the components shown in these exemplary drawings can be replaced by other components or combination of components achieving the same purpose. Also, many other block diagram schemes exist to achieve the same purpose, that these embodiments are exemplary of.

DETAILED DESCRIPTION OF THE INVENTION CONCEPTS AND PREFERRED EMBODIMENTS

The invention concepts are described in this section using the drawings referred to. They do not represent all possible embodiments, but are used primarily for illustrative purposes.

Figure 1:
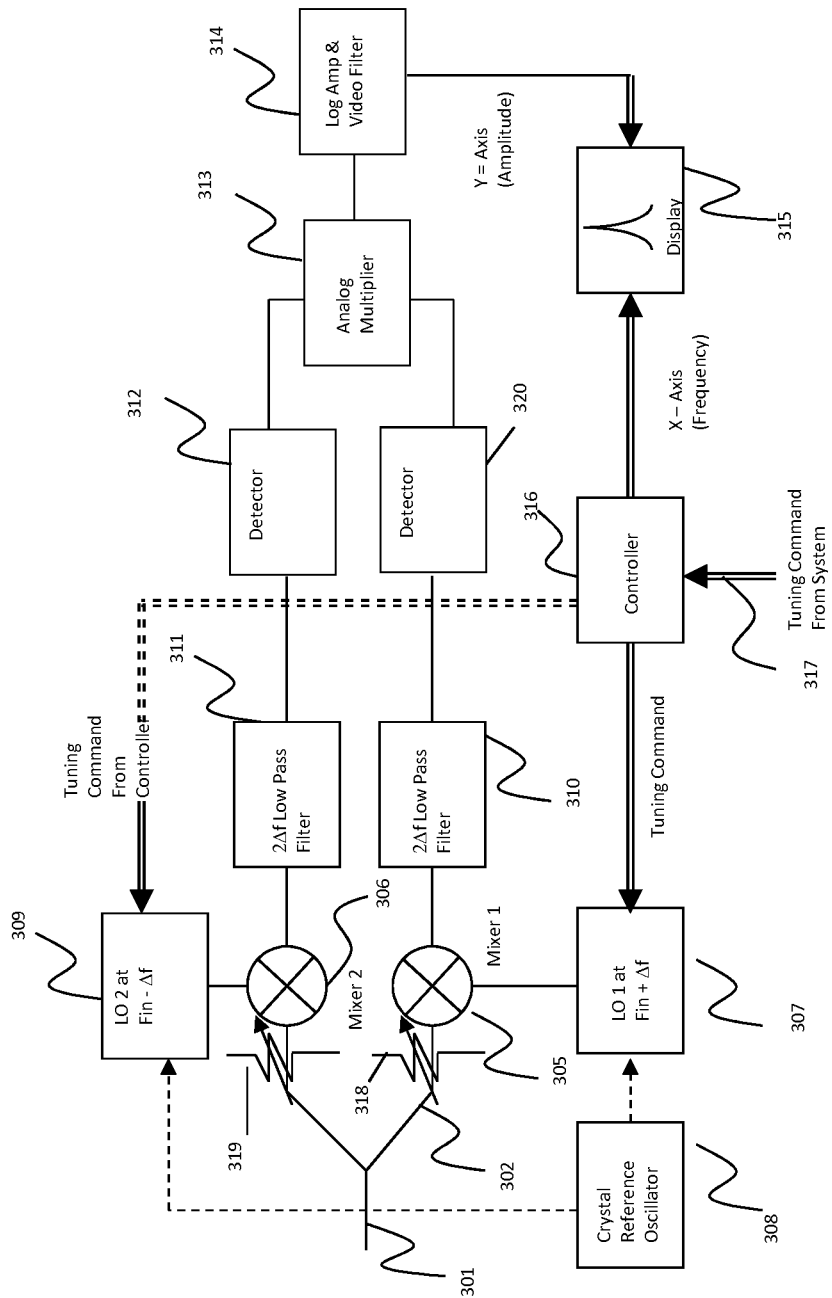
FIG. 1 shows an Adaptive High Speed Receiver System Block Diagram from the Cross Referenced application—Apparatus for Very High Speed Adaptive Spectrum Analysis in block diagram form.

FIG. 1 shows one possible embodiment of the High Speed Digital Transceiver when it is configured as a receiver. This is described in more detailed in the prior referred to patent application. The two mixers, Mixer 1 and Mixer 2, 305 and 306 are tuned at the frequencies of Fin−Δf and Fin+Δf, using Local Oscillators LO1, 307 and Local Oscillator LO2, 309 so that only the frequency Fin that falls between the two frequencies will cause a signal at the output. The frequencies of Local Oscillators LO1 and LO2, which are frequency synthesized signal sources, are controlled by a stable and accurate Crystal Reference oscillator 308, with tuning commands from Controller 316. Effectively, this eliminates any possible image existing, and acts as a very high speed way in which an unknown signal can be identified.

The detectors and analog multipliers enable the signal characteristics to be displayed, and when a signal of interest is seen, unlike with traditional spectrum analyzers, the prior invention referred to allows the sweep to be stopped or hovered around the frequency of interest, and even reversed to more closely study the signal of interest. By changing Δf, the center of the band of interest is kept fixed at frequency Fin, while Δf is changed to the value desired by controlling the two LO frequencies. All this is explained in greater detail in the disclosure that has been referred to at the beginning of this document.

Once a signal has been identified via this process as a legitimate signal and not a spurious image, two issues can arise. One is, if this is a situation that requires some response, what is the nature of the signal and what is the nature of the response. The second is, if the signal is weak, can more about the signal be learned by increasing the receiver sensitivity.

Figure 2:
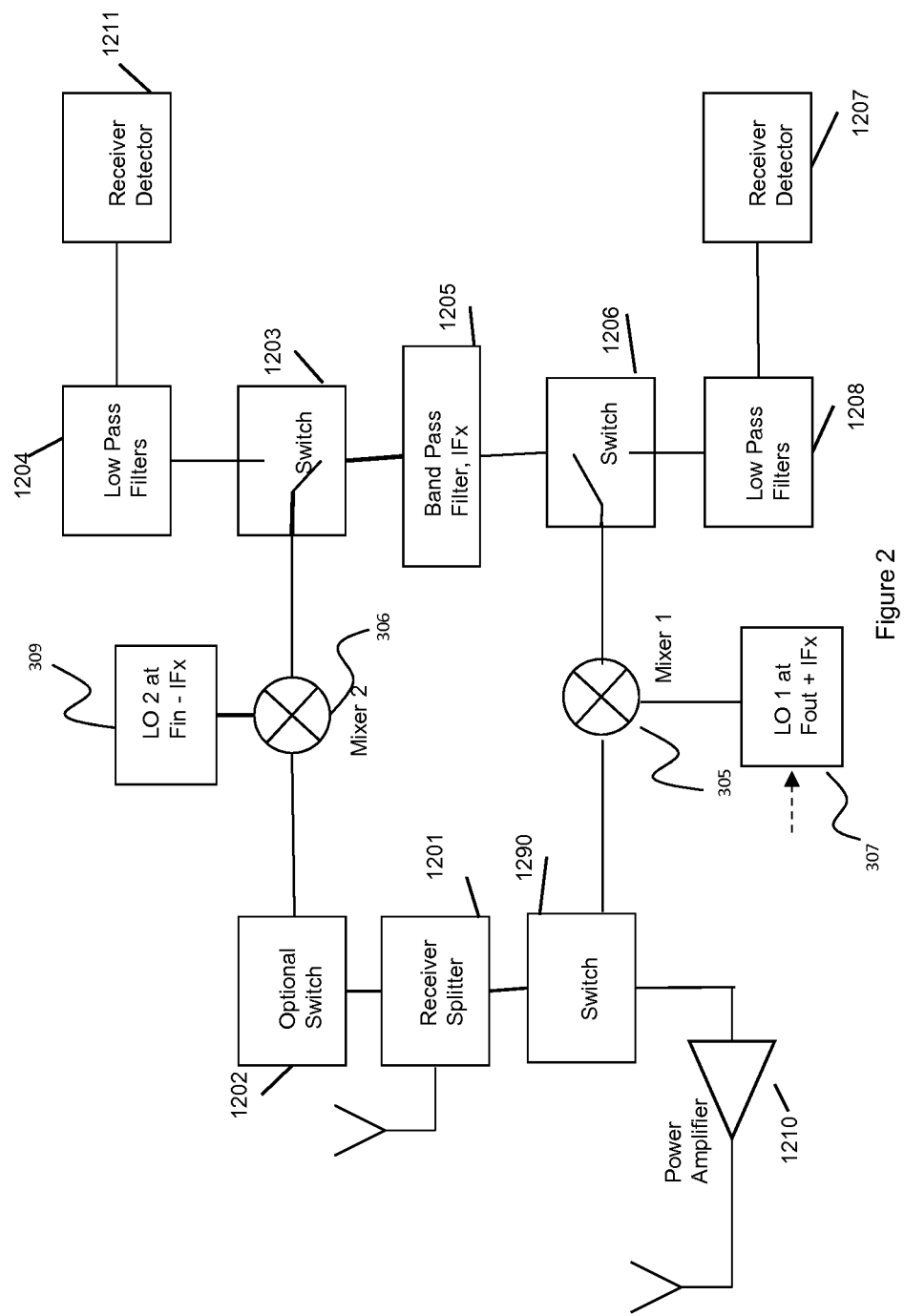
FIG. 2 shows the redeployment of the lower receive arm as the up conversion arm of the transmitter in the Adaptive High Speed Digital Transceiver.

FIG. 2 shows a High Speed Digital Transceiver set up in its simplest form, where it receives a signal, translates it in frequency and rebroadcasts it. This is a situation that can easily occur when a soldier is in enemy territory on a covert mission. The soldier may not have enough signal processing capability, and is depending upon his headquarters (HQ) to provide the necessary analysis of enemy signal, cover, and support actions.

In order to accomplish this, as soon as a signal frequency has been identified, the High Speed Digital Receiver is reconfigured as a High Speed Digital Transceiver. We accomplish this by recognizing that the receiver has two sections, and that if one of the two sections can be allowed to operate as a receiver section, and the other configured to operate as a transmitter, this receiver can be reconfigured as a transceiver, one which is software configurable, or a Software Defined Transceiver. In this case the Receiver splitter 1201 signal does not pass through switch 1209, but goes only to Mixer 2, which is acting as a receiver mixer with Local Oscillator (LO) at frequency Fin−IFx, where IFx is the Intermediate Frequency bandwidth chosen so that the incoming signal characteristics are captured. Mixer 2, 306 and LO2, 309 thus frequency convert the incoming signal frequency along with its sidebands, faithfully to frequency IFx. The band pass filter 1205, centered at IFx, receives this signal from the Single Pole Double Throw (SPDT) switch 1203, eliminates any unnecessary signals, and sends it to the SPDT 1206, from which it is transmitted Mixer 1, 305, and LO 1, 307, set up at frequency Fout+IFx, where Fout is the desired output frequency. The output of this combination goes to SPDT 1209 and from there to the transmitter antenna.

At this point, the transceiver is acting almost like a relay. It does have the following significant differences from a simple radio relay. First, it can continuously scan for unknown signals over wide bandwidths, confident that the signals identified are legitimate and not images. Second, it can retransmit the received signal at a frequency that can be agile so it cannot be picked up easily by others than who it is intended for. Third, it can do this for short periods by employing switches, and as soon as done, can go into a purely receive mode where it conserves battery power and radio silence. The HQ has the responsibility to receive the transmission and make decisions on what countermeasures to take.

In a non-military scenario, this is the same thing a field technician would do when signals in the field exhibit corruption that cannot easily be analyzed by handheld equipment, but the central office, after receiving and analyzing the data can take appropriate corrective measures.

Figure 3:
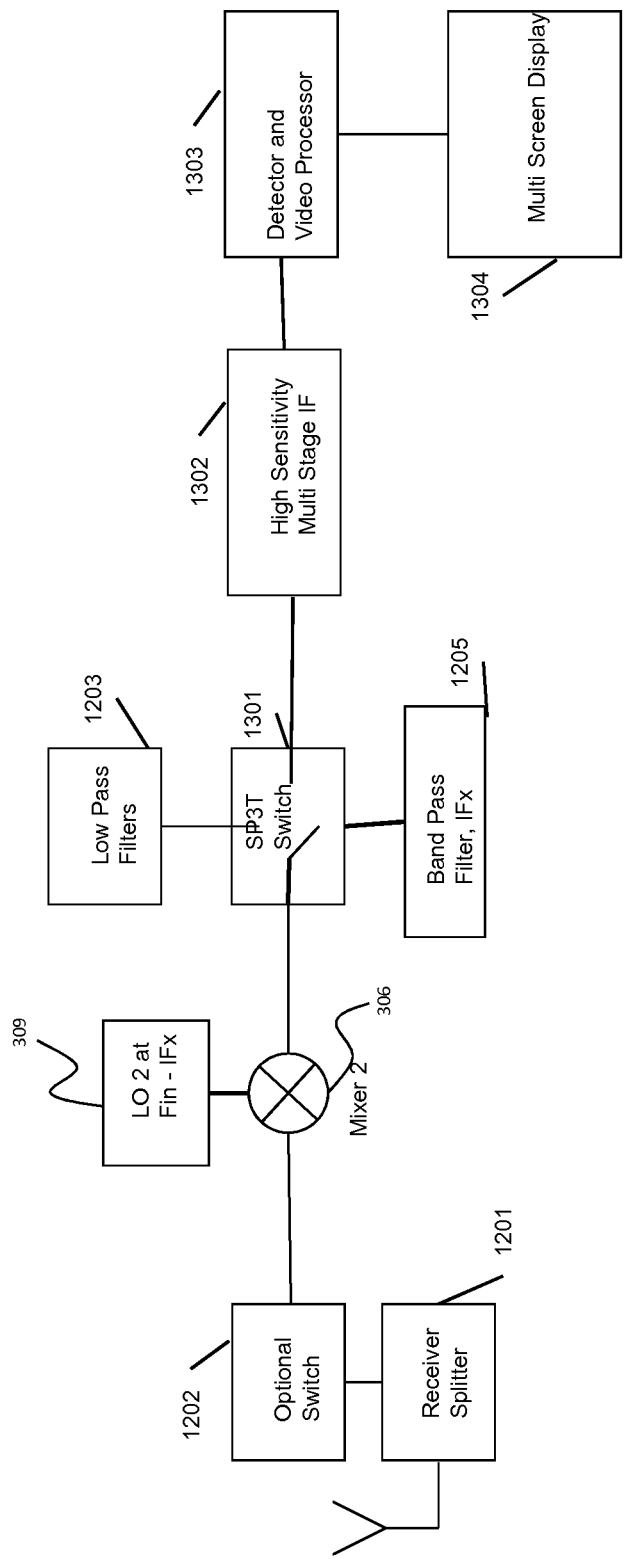
FIG. 3 shows the Receiver in this system being set up to be a high sensitivity signal receiver

FIG. 3 shows another application which addresses capabilities that were not heretofore possible. In this situation, a signal has to be analyzed with adjustable resolution and IF bandwidths or possibly using Fast Fourier Transforms (FFT) so that signals very close to the carrier frequency or small changes in signal amplitude and frequency characteristics close to carrier frequency need to be studied. Such instances may occur, for example, in sensitive modulation measurements for broadband communications systems, or in nuclear fusion experiments where minute reflections need to be studied.

It is then possible to have, within the same receiver, multiple signal processing alternatives. In FIG. 3, the SPDT switch 1203 of FIG. 2 has been replaced with Single Pole Triple Throw (SP3T) switch 1301, where for this application the output of the switch 1301 is connected to the High Sensitivity multi stage IF 1302, which in turn connects to the detector and Video Processor 1303, and in this example to a multi-screen display 1304. This in effect makes the block diagram the same as a traditional spectrum analyzer, except that the dual LO approach eliminates linear sweep, so that the signal of interest can be unambiguously identified in microseconds, and its character as well-determined as any high cost spectrum analyzer. Or, the Mixer 2, 305 output can be switched either to wide bandwidth low pass filter 1203 so that the signal has been converted to baseband frequency, or to wide bandwidth IF filter 1205. Either of these outputs can then be connected to a Fast Fourier Transform Analyzer for what if often referred to as Real Time Spectrum Analysis. By making the IF bandwidth high, for example 500 MHz, and replacing the detector video processor with a tuned Fast Fourier Transform (FFT) engine one can have a FFT analyzer at a fraction of the cost of traditional units, and have it be much faster.

Figure 4:
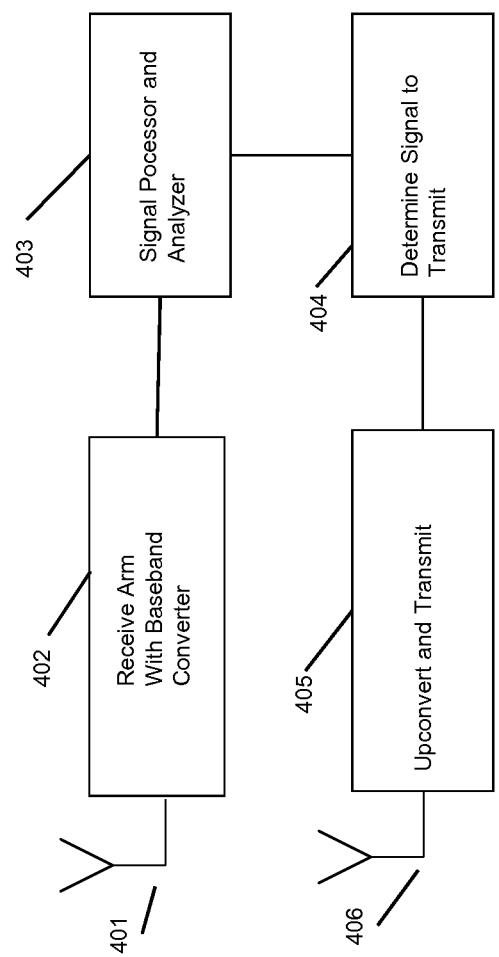
FIG. 4 shows a High Speed Digital Transceiver with Local decision making capability.
Figure 5:
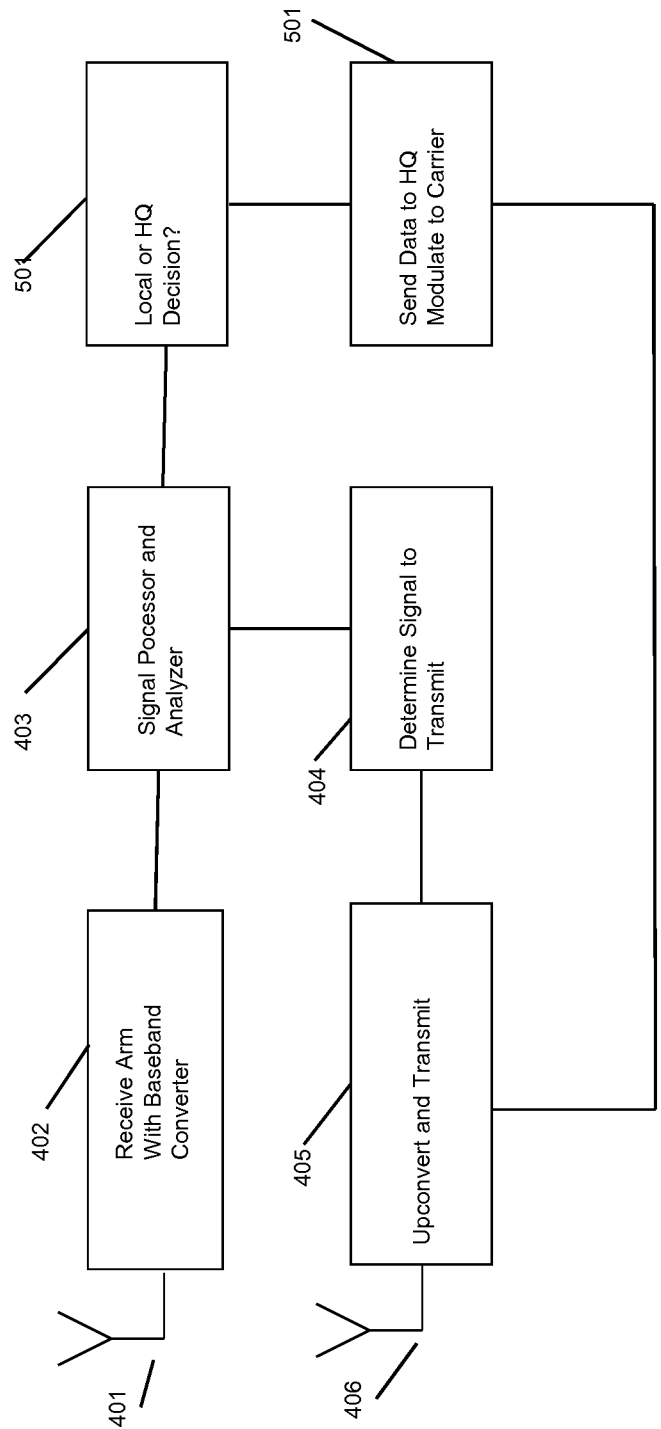
FIG. 5 shows a High Speed Digital Transceiver with Local and Remote decision making capability.

FIGS. 4 and 5 depict receive-transmit situations where the soldier may be in a combat or dangerous situation. In FIG. 4 he or she needs for the equipment that receives the enemy signal to, on the spot, decide on a counter action such as jamming, and to send jamming signals at the received frequency, or employ one of a number of possible deceptive countermeasures for example phase and frequency dither to deceive the enemy.

In FIG. 5, the equipment compares the received and demodulated signals with known threat signals for which local countermeasures exist within the system, and if none do, the signal is up-converted to some safe frequency and transmitted to HQ. In this case the transmit arm is used both to counteract enemy signals and to communicate with HQ.

Clearly, in all these situations it would be a simple matter to add the soldier's voice and data communications to be sent to the soldier, and to have the soldier send and receive HQ or other field units information and commands using the receiver in a traditional fashion.

We claim:

1. A High Speed Adaptive Sweep Capable Digital Transceiver ("HSDTR") usable as a reconfigurable multi-function receive and transmit system consisting of
    a. An adaptive digital sweep capable image rejecting pre-selector free High Speed Digital Receiver that operates with a dual staggered frequency receiver that eliminates image frequencies;
    b. High speed microwave switches that allow one downconverter path to be reconfigured as a transmit section;
wherein, the HSDTR can be configured either as an image free receiver or as a receiver-transmitter by using software controlled single pole multiple throw switches and configuring one or the other of the frequency downconverters as an up-converter;
wherein spurious image suppression can be achieved in the High Speed Digital Receiver using either traditional multistage IF or using wide bandwidth Fast Fourier Transform techniques by using a switch that channels a mixer output either to a traditional spectrum analyzer downconverter section or to a Fast Fourier Transform based analyzer section;
wherein, Local Oscillators for receive, transmit, and receive-transmit functions are all controlled with crystal oscillator references and synthesis algorithms;
wherein, the HSDTR is designed to be autonomous and operating if necessary without any operator or operator intervention;
wherein the HSDTR operation can be controlled from a remote location (hereinafter called "headquarters" or "HQ") to which the HSDTR is connected wirelessly with no field operator interaction;
wherein, the HSDTR control can be shared between field personnel and HQ.

2. The High Speed Adaptive Sweep Digital Transceiver ("HSDTR") of claim 1 wherein the HSDTR can operate as a repeater by converting a received signal to some intermediate frequency and up converting the intermediate frequency to a synthesizer settable output frequency that is controlled to be frequency agile if necessary.

3. The High Speed Adaptive Sweep Digital Transceiver of claim 1 wherein the HSDTR can be configured to be a high sensitivity conventional spectrum analyzer with controllable resolution and video bandwidths, due to the fact that, all possible image input frequencies have been eliminated, allowing the HSDTR to be usable as a Laboratory Grade Spectrum Analyzer with all the advantages of a laboratory spectrum analyzer and without the disadvantage of pre-selection, linear sweep, slow speed and high power consumption, bulk and weight.

4. The High Speed Adaptive Sweep Digital Transceiver of claim 3 where the mixer output is taken at some fixed IF frequency or to baseband frequency and analyzed using Fast Fourier Transform (FFT) techniques over multiple hundreds of MHz bandwidths.

5. The High Speed Adaptive Sweep Digital Transceiver of claim 1 wherein the HSDTR can be configured to be a Transceiver that receives any threat or undesirable signals or interference, decides on reaction strategy based upon demodulated signals and either jams or deploys local deception countermeasures or provide appropriate reports.

6. The High Speed Adaptive Sweep Digital Transceiver of claim 1 wherein the HSDTR can be configured to be a Transceiver that receives any threat or unknown signals, and if a demodulated signal is not one which it knows how to handle, sends either the demodulated signal re-modulated and up converted to communicate with HQ.

7. The High Speed Adaptive Sweep Digital Transceiver of claim 1 wherein the HSDTR is a handheld unit that is battery operated and deployed in the field.

8. The High Speed Adaptive Sweep Digital Transceiver of claim 1 wherein the HSDTR is a benchtop unit that is used in laboratories and in production testing.

9. The High Speed Adaptive Sweep Digital Transceiver of claim 1 wherein the HSDTR is a unit that is remotely controlled via a local area network (LAN) or a wide area network (WAN).

10. The High Speed Adaptive Sweep Digital Transceiver of claim 1 wherein the HSDTR is a unit that is wearable on an individual.

11. The High Speed Adaptive Sweep Digital Transceiver of claim 1 wherein the HSDTR is a unit that uses a single antenna to receive and transmit.

12. The High Speed Adaptive Sweep Digital Transceiver of claim 1 wherein the HSDTR is a unit that uses different antennas to receive and transmit.

13. The High Speed Adaptive Sweep Digital Transceiver of claim 1 wherein the HSDTR is a unit that uses frequency or space diversity as needed.

* * * * *